United States Patent [19]

Katsumata

[11] Patent Number: 4,661,761
[45] Date of Patent: Apr. 28, 1987

[54] INTERNAL COMBUSTION ENGINE ELECTRICAL SYSTEM

[75] Inventor: Mitsuo Katsumata, Susono, Japan

[73] Assignee: Kokusan Denki Co., Ltd., Numazu

[21] Appl. No.: 700,262

[22] Filed: Feb. 11, 1985

[51] Int. Cl.⁴ ............................................... H02J 7/14
[52] U.S. Cl. ..................... 322/28; 290/1 R;
         363/160; 322/32; 322/38; 322/89
[58] Field of Search ........................ 322/29, 32, 89, 90,
         322/94, 38, 28; 363/160, 37; 290/1 R

[56] References Cited

U.S. PATENT DOCUMENTS

| | | | |
|---|---|---|---|
| 3,967,185 | 6/1976 | Brooks | 363/160 |
| 4,079,307 | 3/1978 | Hazumi et al. | 322/32 X |
| 4,117,389 | 9/1978 | Hazumi et al. | 322/32 X |
| 4,119,861 | 10/1978 | Gocho | 322/32 X |
| 4,415,848 | 11/1983 | Morishita | 322/32 |
| 4,545,002 | 10/1985 | Walker | 363/37 |

Primary Examiner—R. J. Hickey
Attorney, Agent, or Firm—Pearne, Gordon, McCoy & Granger

[57] ABSTRACT

An internal combustion engine electrical system is disclosed which is adapted to use an internal combustion engine as a driving source. The generating system is constructed in a manner such that the output of an A.C. generator driven by the engine is rectified by a rectifier circuit, and the output of the rectifier circuit is inverted into an A.C. output by an inverter circuit adapted to use, a commutation command signal, the output of an oscillator circuit which generates a signal of a constant frequency.

5 Claims, 11 Drawing Figures

INTERNAL COMBUSTION ENGINE ELECTRICAL SYSTEM

BACKGROUND OF THE INVENTION

1. Field of the Invention

This invention relates to an internal combustion engine electrical system, and more particularly to an internal combustion engine driven generating system which is adapted to allow an internal combustion engine to drive an A.C. generator to obtain A.C. power to be supplied to a load.

2. Description of the Prior Art

In general, such a generating system has been substituted for a commercial AC power supply. Accordingly, it is required to keep the output frequency of the generating system at a commercial frequency of 50 or 60 HZ and the output voltage at a commercial voltage of 100 V, 120 V or the like. However, a conventional internal combustion engine driven generating system is constructed to supply the output of a generator directly to a load, so that it is required to keep the rotational speed of the generator constant. This renders control of the rotational speed of the engine troublesome. Also, in the conventional generating system, when the output of a commercial frequency is to be obtained in the case that the engine and the generator are directly coupled with each other, the engine speed is limited within a predetermined range. This renders an increase in ratio between the displacement of the engine and the output of the generator highly difficult. More particularly, when output of a frequency of, for example, 50 Hz is to be obtained, the use of a generator having two poles requires to set the rotational speed of the engine at 3000 rpm; however, it is substantially impossible to design an engine which is capable of generating maximum output at such a low engine speed. Also, the use of a generator having 4 poles or more to increase the output of the generator requires that the rotational speed of an engine is further decreased due to a relationship $f = PN/120$ (f: frequency, P: number of poles, N: rotational speed), resulting in the design of an engine being further difficult.

There is another conventional internal combustion engine driven generating system which is constructed to connect a generator through a reducer, a belt or the like to the engine. Such construction ensures an increase in rotational speed of the engine. However, the generating system has a drawback that the rotational speed of the engine is required to be controlled within a range to avoid the variation in frequency, as in the above-described prior art generating system. Also, the provision of the reducer between the engine and the generator renders the overall construction of the generating system highly complicated, to thereby necessarily cause the system to be large-sized.

The conventional internal combustion engine driven generating system as described above has another disadvantage that when a generator which cannot adjust flux of a field system such as an A.C. magneto or permanent magnet A.C. generator is used in the generating system, it fails to compensate the variation of the output voltage due to the variation of load. Further, the permanent magnet A.C. generator has characteristics that the output voltage is decreased with an increase in load current, so that a decrease in load causes the output voltage to be increased. In particular, a substantial decrease in load at a high rotational speed causes the output voltage to be considerably increased, thus, there is a fear that a load connected to the generator is damaged.

SUMMARY OF THE INVENTION

The present invention has been made in view of the foregoing disadvantage of the prior art.

Accordingly, it is an object of the present invention to provide an internal combustion engine driven generating system which is capable of eliminating the above-described disadvantage of the prior art by obtaining an A.C. voltage of a constant frequency irrespective of the speed of an internal combustion engine.

It is another object of the present invention to provide an internal combustion engine driven generating system which is capable of preventing an excess voltage from being applied to a load at a small load as well as generating an output voltage of a constant frequency.

It is another object of the present invention to provide an internal combustion engine driven generating system which is capable of varying the rotational speed of a generator to supply required power to a load depending upon variation of the load.

It is another object of the present invention to provide an internal combustion engine driven generating system of high efficiency which is capable of reducing power loss in a constant voltage supply circuit.

It is a further object of the present invention to provide an internal combustion engine driven generating system which is small-sized and lightweight, generates large output, and is of high efficiency.

It is still a further object of the present invention to provide an internal combustion engine driven generating system which is capable of increasing the speed of an internal combustion engine to increase a ratio between the displacement of the engine and the output of a generator.

In accordance with the present invention, there is provided an internal combustion engine electrical system comprising an A.C. generator driven by an internal combustion engine; a rectifier circuit for rectifying A.C. output generated by said A.C. generator; a constant voltage power circuit which outputs a substantially constant D.C. voltage; an oscillator circuit driven by means of the output voltage of said constant voltage power circuit; an inverter circuit adapted to invert the D.C. output of said rectifier circuit into an A.C. output of a predetermined frequency using the output signal of said oscillator circuit as a commutation command signal a contactless ignition system for controlling the ignition operation of said internal combustion engine; an output voltage detecting circuit connected to be responsive to the output of said A.C. generator to generate a detecting signal corresponding to the output voltage of said A.C. generator; and an ignition control circuit which is adapted to control said contactless ignition system so as to decrease the rotational speed of said internal combustion engine when said detecting signal of said output voltage detecting circuit reaches a predetermined level.

In an embodiment of the present invention, said internal combustion engine is ignited by a contactless ignition system and said A.C. generator comprises a permanent magnet A.C. generator; and there is also provided an output voltage detecting circuit connected to a circuit from the output terminal of said A.C. generator to said load to generate a detecting signal corresponding to the output voltage of said A.C. generator, and an ignition control circuit which is adapted to control said contactless ignition system so as to decrease the rotational speed of said internal combustion engine when said detecting signal of said output voltage detecting circuit reaches a predetermined level or more.

BRIEF DESCRIPTION OF THE DRAWINGS

Other objects and many of the attendant advantages of the present invention will be readily appreciated as the same becomes better understood by reference to the following description when considered in connection with the accompanying drawings, wherein:

FIG. 5 is a circuit diagram detailedly showing the embodiment of FIG. 4;

FIG. 6 is a diagrammatic view showing operation of an ignition control circuit; and FIG. 7 is a diagrammatic view showing one example of characteristics of a permanent magnet A.C. generator.

DETAILED DESCRIPTION OF THE PREFERRED EMBODIMENTS

Now, an internal combustion engine electrical system according to the present invention will be described with reference to the accompanying drawings.

Figure 1:
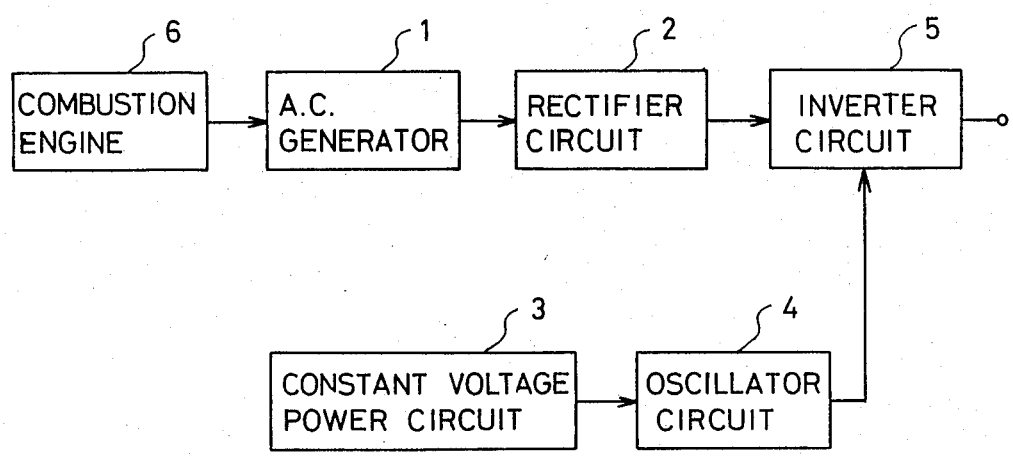
FIG. 1 is a block diagram showing the basic structure of an engine driven generating system according to the present invention.

FIG. 1 shows the basic structure of an internal combustion engine driven generating system according to the present invention, wherein reference numeral designates 1 designates an A.C. generator driven by an internal combustion engine 6. The output of the A.C. generator 1 is rectified by a rectifier circuit 2. Reference numeral 3 indicates a constant voltage power circuit which is adapted to utilize, as its input power, the output of the A.C. generator 1, the output of the rectifier circuit 2 or the like and generates or outputs a substantially constant D.C. voltage. Reference numeral 4 indicates an oscillator circuit which is adapted to generate a signal of a constant frequency using the output voltage of the constant voltage power circuit 3. 5 designates an inverter circuit 5 which is adapted to use, as a commutation command signal, the signal generated from the oscillator circuit 2 to invert the D.C. output from the rectifier circuit 2 into A.C. output of a predetermined frequency.

Figure 2:
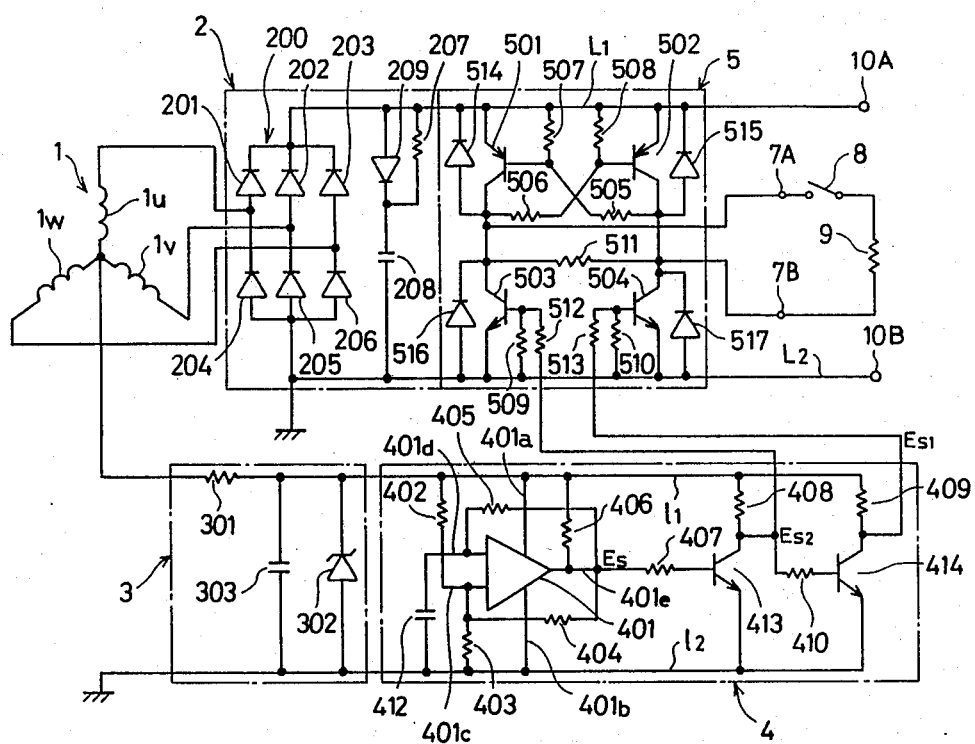
FIG. 2 is a circuit diagram showing one embodiment of an engine driven generating system according to the present invention.

FIG. 2 shows one embodiment of an internal combustion engine driven generating system according to the present invention wherein a three-phase A.C. generator is used as an A.C. generator 1 driven by an internal combustion engine as indicated by reference numeral 6 in FIG. 1. The A.C. generator has three-phase armature windings $1u-1w$ connected together by star connection.

Figure 3:
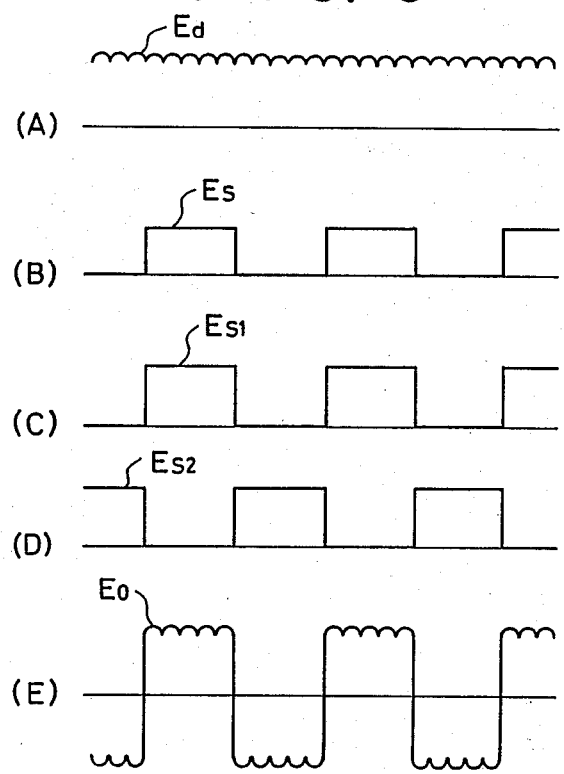
FIGS. 3A to 3E are wave forms showing voltages at the respective portions shown in FIG. 2.

A rectifier circuit 2 includes a three-phase full wave rectifier 200 comprising diodes 201–206, which is adapted to allow such a D.C. output voltage Ed as shown in FIG. 3A to be obtained on the output side of the full wave rectifier 200. The full wave rectifier 200 have a seriescircuit of a resistor 207 and a capacitor 208 connected across the output terminals thereof. Reference numeral 209 designates a diode which is connected across both ends of the resistor 207 and of which the anode is directed to the the positive D.C. output terminal of the full wave rectifier 200.

The diode 209, capacitor 208 and resistor 207 form together a circuit for preventing noise and overvoltage, which serves to absorb over-voltage and noise generated due to the operation of an inverter circuit 5 to protect transistors 501–504 in the inverter circuit 5.

In the illustrated embodiment, a constant voltage power circuit 3 comprises a resistor 301 connected at one end thereof to the neutral point of the armature windings $1u-1w$, a Zener diode 302 of which the cathode and anode are respectively connected to the other end of the resistor 301 and the negative D.C. output terminal of the rectifier circuit 2, and a capacitor 303 connected in parallel to the Zener diode 302; so that a constant voltage equal to the Zener voltage may appear at both ends of the capacitor 303. An oscillator circuit 4 comprises an operational amplifier 401, resistors 402–410, a capacitor 412 and transistors 413 and 414. More particularly, the oscillator circuit 4 is constructed in a manner such that the power terminals 401a and 401b of the operational amplifier 401 are connected to positive and negative power lines $l_1$ and $l_2$ which are connected to the cathode and anode of the Zener diode 302, respectively, and one input terminal 401c of the operational amplifier 401 is connected through the resistors 402 and 403 to the power lines $l_1$ and $l_2$, respectively. To the one input terminal 401c and the other input terminal 401d of the operational amplifier 401 are respectively connected to one end of the resistor 404 and that of the resistor 405, and the other ends of the resistors 404 and 405 are commonly connected to the output terminal 401e of the operational amplifier 401. To the output terminal 401e of the operational amplifier 401 is also connected one end of the resistor 406, of which the other end is connected to the positive power line $l_1$. The operational amplifier 401 is also connected at the input terminal 401d thereof to one end of the capacitor 412, of which the other end is connected to the negative power line $l_2$. The operational amplifier 401 has an output terminal 401e connected through the resistor 407 to the base of the transistor 413, of which the emitter is connected to the power line $l_2$ together with the emitter of the transistor 414. The collectors of the transistors 413 and 414 are connected through the resistors 408 and 409 to the power line $l_1$, respectively, and the collector of the transistor 413 is connected through the resistor 410 to the base of the transistor 414.

In the oscillator circuit 4 described above, the operational amplifier 401, resistors 402–406 and capacitor 412 constitute a rectangular signal oscillator (astable multivibrator) known in the art, and the transistors 413 and 414 and the resistors 407–410 constitute a commutation command signal output circuit. The rectangular signal oscillator is adapted to carry out oscillation at a commercial frequency to allow a rectangular signal Es as shown in FIG. 3B to appear at the output end of the amplifier 401. For a period of time during which the rectangular signal Es is generated, the transistor 413 is turned on, resulting in the transistor 414 being nonconductive or turned off; whereas, the transistor 413 is turned off for a period of time during which the rectangular signal is not generated, so that the transistor 414 is made conductive. Thus, such a commutation command signal Es1 of a rectangular shape as shown in FIG. 3C appears at the collector of the transistor 414 and such a commutation command signal of a rectangular shape as shown in FIG. 3D appears at the collector of the transistor 413.

An inverter circuit 5 comprises PNP transistors 501 and 502, NPN transistor 503 and 504, resistors 505-511, and diodes 514-517. The emitters of the transistors 501 and 502 are commonly connected to power line $L_1$ connected to the positive D.C. output terminal of the rectifier circuit 2, and the emitters of the transistors 503 and 504 are connected together to a power line $L_2$ connected to the negative D.C. output terminal of the rectifier circuit 2. The collector of the transistor 501 is connected to the collector of the transistor 503, and the collector of the transistor 502 is connected to the collector of the transistor 504; and the bases of the transistors 501 and 502 are connected via the resistors 505 and 506 to the collectors of the transistors 502 and 501, respectively. Between the bases of the transistors 501-504 and the emitters thereof, the resistors 507-510 are connected in parallel, respectively; and the resistor 511 is connected between the connection of the collector of the transistor 501 with the collector of the transistor 503 and the connection of the collector of the transistor 502 with the collector of the transistor 504. The base of the transistor 503 is connected through the resistor 512 to the collector of the transistor 413 provided in the oscillator circuit 4, and the base of the transistor 504 is connected through the resistor 513 to the collector of the transistor 414. Also, between the collector of the transistor 501 and the emitter thereof is connected the diode 514 in parallel, and the diode 515 is connected in parallel between the collector and emitter of the transistor 502. Also, between the respective collectors and emitters of the transistors 503 and 504 are connected the diodes 516 and 517 in parallel, respectively. To both ends of the resistor 511 are connected output terminals 7A and 7B connected, and the output terminal 7A is connected through a switch 8 to one end of a load 9 and the output terminal 7B is connected directly to the other end of the load 9.

In the inverter circuit 5 constructed as described above, the supply of the commutation command signal to the base of the transistor 504 permits a base current to be supplied to the base of the transistor 504. When this causes the transistor to be turned on, a base current is supplied from the positive power line $L_1$ through the emitter-base circuit of the transistor 501, the resistor 505 and the collector-emitter circuit of the transistor 504, to thereby render the transistor 501 conductive. At this time, the potential of the base of the transistor 503 is kept at substantially zero, so that the transistor 503 is kept at a non-conductive state. In this state, a base current is not supplied to the base of the transistor 502, resulting in the transistor 502 also being made non-conductive. This causes a current to be flowed through the resistor 511 in one direction thereof by way of a path from the power line $L_1$ through the emitter-collector circuit of the transistor 501, the resistor 511, the collector-emitter circuit of the transistor 504 to the power line $L_2$. Subsequently, when the commutation command signal Es1 is generated and the commutation command signal Es2 is rendered zero, the transistor 503 is turned on and the transistor 504 is turned off. At this time, a base current is supplied to the transistor 502 to turn on the transistor 502, so that a current is flowed through the resistor 511 in the direction opposite to the above-described direction by way of a path from the power line $L_1$ via the emitter-collector circuit of the transistor 502, the resistor 511 and the collector-emitter circuit of the transistor 503 to the power line $L_2$.

Because such operation is repeatedly carried out, such an A.C. voltage Eo as shown in FIG. 3E appears across both ends of the resistor 511, which is applied to the load 9. The frequency of the A.C. voltage Eo is determined depending upon the oscillation frequency of the oscillator circuit 4, accordingly, the setting of the oscillation frequency of the oscillator circuit 4 at a commercial frequency allows A.C. output of a commercial frequency to be generated irrespective of the rotational speed of the generator 1.

In the embodiment shown in FIG. 2, the power lines $L_1$ and $L_2$ are provided with external terminals 10A and 10B, respectively. The provision of such external terminals has an advantage of, for example, facilitating the charging of a battery when it is connected to the terminals.

The construction of the constant voltage power circuit 3 in the manner as described above decrease the loss of the circuit 3, to thereby significantly improve the efficiency of the generating system. More particularly, as a power supply for the oscillator circuit 4, it is first considered to construct the constant voltage power circuit by connecting the Zener diode 302 and capacitor 303 in parallel with the output terminals of the rectifier circuit 2 through the resistor 301, respectively. Such construction of the constant voltage power circuit does not substantially cause any problem. Nevertheless, such construction causes the high output voltage of the full wave rectifier 200 (about 140 V supposing that the effective value of output of the generator 1 is 100 V) to be applied across the Zener diode 302 and capacitor 303 through the resistor 301. Accordingly, in order that a low voltage such as, example, 12 V suitable for driving the oscillator circuit 4 is to be obtained across both ends of the capacitor 303, it is necessary to considerably increase the resistance of the resistor 301. For example, when the output of the rectifier circuit 2 is to be used as a power supply for the oscillator circuit 4 in a generating system for generating an output power of, for example, about 100-200 W, the loss in output power at the resistor 301 reaches a level as high as about 2W, to thereby necessarily cause the efficiency of the generating system. On the contrary, the illustrated embodiment, as described above, is constructed in the manner that the input terminals of the oscillator circuit 4 are connected between the neutral point of the armature windings and the negative D.C. output terminal of the rectifier circuit 2, so that a voltage corresponding to about $1/\sqrt{3}$ of the output voltage of the generator 1 may be applied across the resistor 301. This allows the resistance of the resistor 301 to be decreased by $1/\sqrt{3}$ to decrease the loss at the resistor 301, to thereby significantly increase the efficiency of the generating system.

Figure 4:
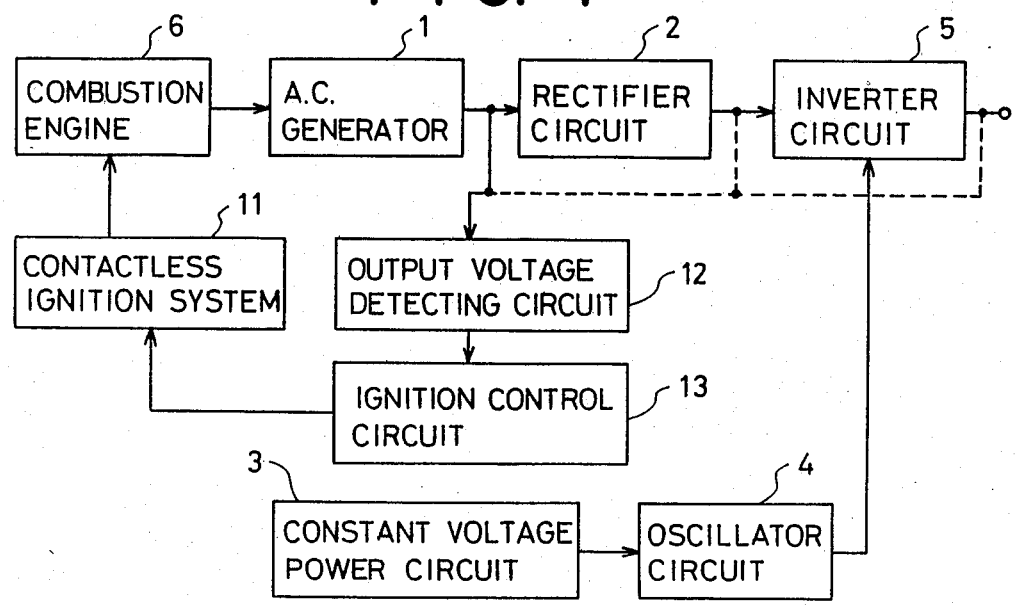
FIG. 4 is a block diagram showing another embodiment of an engine driven generating system according to the present invention.

FIG. 4 is a block diagram showing a second embodiment of an internal combustion engine electrical system according to the present invention. The second embodiment is adapted to drive a permanent magnet A.C. generator 1 using an internal combustion engine 6 ignited by a contactless ignition system 11. Also, the second embodiment includes, in addition to such a basic structure as shown in FIG. 1, an output voltage detecting circuit 12 connected to a circuit or line from the output terminal of the A.C. generator 1 to a load to generate a detecting signal corresponding to the output voltage of the A.C. generator and an ignition control circuit 13 adapted to control the contactless ignition system 11 so as to decrease the speed of the internal combustion engine 6 when the output signal of the output voltage detecting circuit 12 is at a predetermined level or more. In practice, the ignition control circuit 13 is constructed to control the ignition system so as to delay or stop the ignition position of the engine.

The second embodiment constructed as described above is adapted to cause the contactless ignition system 11 to rapidly change the primary current of an ignition coil due to the operation (turning-on or turning-off) of a semiconductor switch at the ignition position of the engine to induce a high voltage across the second winding of the ignition coil. The high voltage output of the ignition system is supplied to an ignition plug attached to a cylinder of the engine 6. For example, as such a contactless ignition system 11, an ignition system of the current interruption type may be used which is adapted to interrupt, at the ignition position of the engine, a current supplied from the primary winding of the ignition coil or an exciter coil through the semiconductor switch thereto to induce a high voltage across the primary winding or exciter coil and further increase the voltage by means of the ignition coil, to thereby obtain a voltage sufficient for the ignition. Alternatively, an ignition system of the capacitor discharge type may be used which is adapted to discharge electric charge in a capacitor provided on the primary winding side of the ignition coil and charged through the semiconductor switch (normally thyristor) to the primary winding of the ignition coil, to thereby induce a high voltage across the secondary winding of the ignition coil.

The output voltage detecting circuit 12 serves to generate a detecting signal corresponding to the output voltage of the A.C. generator 1. The detecting circuit 12, may be connected to the output terminal of the A.C generator as indicated by a solid line in FIG. 4 or connected to the output side of a rectifier circuit 2, the output side of an inverter circuit 5 or the like as indicated by dotted lines in FIG. 4.

The ignition control circuit 13 serves to control the ignition operation of the engine so as to decrease the speed of the engine when the detecting signal generated or output from the output voltage detecting circuit 12 reaches a predetermined level or more. In practice, the detecting circuit 12 is constructed to control the contactless ignition system 11 so as to delay the ignition position or ignition timing of the engine or fail in or stop the ignition at the ignition timing. Such construction prevents a maximum voltage which the generator is capable of generating when a load is decreased from being applied to the load.

FIG. 5 is a circuit diagram detailedly showing the embodiment of FIG. 4, in which the same reference characters as used in FIG. 2 designate parts same as or corresponding to those in FIG. 2. Accordingly, the following description on the second embodiment will be mainly directed to the difference from the first embodiment described above.

In the second embodiment, in order to obtain a power supply for a constant voltage power circuit 3 from a rectifier circuit 2, the input terminal of the constant voltage power circuit 3 or one end of a resistor 301 is connected to the connection between a resistor 207 and a capacitor 208 provided in the rectifier circuit 2.

The contactless ignition system 11 for carrying out the ignition of the internal combustion engine 6 includes an ignition coil 11A provided in the permanent magnet A.C. generator 1, which is adapted to induce an A.C. voltage across both ends of the primary winding $W_1$ thereof in synchronism with the rotation of the engine 6. Across both ends of the primary winding $W_1$ of the ignition coil 11A is connected the collector-emitter circuit of a transistor 11B, and between the base and the collector of the transistor 11B is connected a resistor 11C in parallel. The base of the transistor 11B is connected thereto the anode of a thyristor 11D, of which the cathode is connected to the emitter of the transistor 11B. Across the anode-gate circuit of the thyristor 11D and the gate-cathode circuit thereof are connected resistors 11E and 11F, respectively. The secondary winding $W_2$ of the ignition coil 11A is connected to an ignition plug 6A mounted on a cylinder of the engine 6.

In the ignition system 11 of such construction, an A.C. voltage is induced across the primary winding of the ignition coil 11A in synchronism with the rotation of the engine. A base current is allowed to be supplied through the resistor 11C to the base of the transistor 11B by means of one half-cycle of the A.C. voltage, to thereby make the transistor 11B conductive. This causes a primary current to start to flow from the primary winding $W_1$ of the ignition coil 11A through the collector-emitter circuit of the transistor 11B. When the current gradually increases to cause a voltage appearing across the collector-emitter circuit of the transistor 11B to reach at a predetermined level or more, a turn-on signal is supplied to the thyristor 11D to render it conductive, to thereby turn off the transistor 11B. Since such turning-off of the transistor 11B takes place in a short time, a high voltage is induced across the primary winding $W_1$ of the ignition coil 11A, which is further increased by the ignition coil 11A and applied across the ignition plug 6A of the engine 6. This results in the ignition plug 6A generating spark, to thereby ignite the engine.

In the ignition system described above, the transistor 11B may be replaced with a plurality of transistors connected with each other by darlington connection. Also, a transistor is substituted for the thyristor 11D. Further, the semiconductor switch for controlling the primary current may be constituted by any other switching element such as a gate-turn-off thyristor (GTO) or the like.

The output voltage detecting circuit 12 comprises a diode 12A connected at the anode thereof to the positive D.C. output terminal of a three-phase full wave rectifier 200, a resistor 12B connected at one end thereof to the cathode of the diode 12A, a resistor 12C connected between the other end of the resistor 12B and the negative D.C. output terminal of the rectifier 200, and a smoothing capacitor 12D connected across the resistor 12C. The detecting circuit 12 is adapted to allow a detecting signal to appear across a parallel circuit of the resistor 12C and capacitor 12D which corresponds to the output voltage of the A.C. generator 1.

The ignition control circuit 13 comprises a transistor 13A and a Zener diode 13B with the base of the transistor 13A being connected through the Zener diode 13B to the connection between the resistors 12B and 12C. Also, the transistor 13A is connected at the collector to the gate of the thyristor 11D and at the emitter thereof to the cathode of the thyristor 11D. The transistor 13A is turned on when a base current is supplied thereto through the Zener diode 13B, and the turning-on of the transistor 13A causes the whole current or a part thereof which is to be supplied to the gate of the thyristor 11D depending upon the internal resistance of the transistor 13A to be bypassed from the thyristor through the collector-emitter circuit of the transistor 13A.

In the illustrated embodiment, when the output voltage of the A.C. generator 1 is below a predetermined level, a base current is not supplied to the transistor 13A because a voltage appearing across the resistor 12C of the output voltage detecting circuit 12 is below the Zener level of the Zener diode 13B. Thus, the transistor 13A is kept non-conductive, so that the ignition system 11 normally operates without being affected by the ignition control circuit 13. During the normal operation of the ignition system 11, it is supposed that the rotation of the engine is carried out at a speed at which substantially the maximum output is generated and a turn-on signal is supplied to the thyristor 10D when a primary current i flowing from the primary winding $W_1$ through the collector-emitter circuit of the transistor 11B reaches a level $i_1$ at an angle $\theta_{i1}$ at which the phase is in advance of the top dead center TDC of the engine as shown in FIG. 6. In this state, a rapid decrease of the load 9 causes the output voltage of the A.C. generator 1 to be increased due to such characteristics of the permanent magnet A.C. generator as shown in FIG. 7. In FIG. 7, $N_1$, $N_2$, $N_3$ and $N_4$ indicate curves obtained when the rotation numbers are 5000, 5500, 6000 and 6500 rpm, respectively. When the output voltage of the A.C. generator exceeds the predetermined level, a base current is supplied to the transistor 13A to allow the transistor 13A to be in an active region or at a state that the transistor is not quite conductive, so that a current to be supplied to the gate of the thyristor 11D is partially bypassed through the transistor 13A. This causes a phase at which a turn-on signal is supplied to the thyristor 11D to be delayed, because it is required to compensate a current corresponding to the current bypassed through the transistor 13A. For example, when the primary current i reaches a level $i_2$ ($>i_1$) at an angle $\theta_{i2}$ as shown in FIG. 6, a turn-on signal is supplied to the thyristor 11D. Accordingly, the ignition operation is carried out at the angle $\theta_{i2}$, so that the ignition position is delayed in the direction of the top dead center TDC. This causes the rotational speed of the engine to be decreased, resulting in the output voltage of the generator 1 being decreased. When the rate of increase in output voltage of the generator is further increased in the case that the load is decreased, a base current supplied to the transistor 13A is increased; so that the amount of a current bypassed from the gate of the thyristor 11D is increased to cause a phase at which a turn-on signal is supplied to the thyristor 11D to be further delayed. More specifically, as the rate of increase in output voltage of the generator is increased, the level of the primary current i at which the thyristor 11D is made conductive is increased as indicated by $i_3$ and $i_4$ in FIG. 6; thus, the ignition position is further delayed in the direction of the top dead center, as indicated by $\theta_{i3}$ and $\theta_{i4}$ in FIG. 6. In the case that the rotational speed of the engine is not decreased even when the ingition position is delayed, a base current supplied to the transistor is increased, so that a turn-on signal is caused not to be supplied to the thyristor 11D even when the primary current i reaches the level $i_4$ (peak value). Such a state prevents the supply of a turn-on signal to the thyristor 11D, so that the engine may not carry out the ignition operation. Accordindly, the ignition operation of the engine is stopped to cause the rotational speed to be positively decreased. When the output voltage of the A.C. generator is decreased below the predetermined level due to such a phenomenon, the supply of a base current to the transistor 13A is prevented to stop the operation of the ignition control circuit 13, to thereby allow the engine to carry out a normal ignition operation.

The illustrated embodiment may be constructed in a manner to connect the collector of the transistor 13A in the ignition control circuit 13 to one end of the primary winding $W_1$ as indicated by dotted lines in FIG. 5. Such construction allows the engine to initially stop the ignition operation when the output voltage of the A.C. generator exceeds the predetermined level. Also, in such a case, a thyristor may be used instead of the transistor 13A.

In the second embodiment described above, the primary winding $W_1$ of the ignition coil 11A serves also as an ignition power coil. Alternatively, the present invention may be embodied in a manner such that the ignition coil is arranged at the exterior of the permanent magnet A.C. generator 1 and an exciter coil is provided in the A.C. generator 1 to be used as the ignition power coil. Also, the use of a contactless ignition system in the embodiment which utilizes a signal coil adapted to generate a signal for determining the ignition position as in an ignition system of the capacitor discharge system may be realized by bypassing, through the transistor 13A, a trigger signal supplied from the signal coil to the semiconductor switch.

Further, the second embodiment may be constructed in a manner such that the input terminal of the constant voltage power circuit 3 or one end of a resistor 301 to the neutral point of the armature windings of the generator 1, as in the embodiment shown in FIG. 2.

As is apparent from the foregoing, the second embodiment effectively prevents a large voltage from being applied to the load when the load is decreased, because it is adapted to delay the ignition position of the engine or stop the ignition operation of the engine to reduce the rotational speed of the engine when the output voltage of the A.C. generator reaches the predetermined level or more.

It should be noted that the present invention is applicable to not only a generating system of the portable type or installation type which is adapted to drive a generator by an internal combustion engine but a case that A.C. power of a commercial frequency is to be obtained from an A.C. generator such as a permanent magnet generator mounted on an automobile, an outboard motor or the like. Thus, it is a matter of course that the use of an A.C. generator attached to an automobile, an outboard motor or the like as the generator 1 is included in the scope of the present invention.

In the embodiments described above, a full wave rectifier is typically used as the rectifier circuit 2. However, a half wave rectifier may be substituted therefor if it is specifically desired, and a smoothing circuit may be provided in the rectifier circuit 2 as required. Alternatively, as the rectifier circuit 2, a controlled rectifying circuit may be substitutionally used which uses rectifying devices, to thereby control the phase of the rectifying devices so as to keep the terminal voltage of the load within a constant range.

The constant voltage power circuit serves to generate a constant D.C. voltage necessary to stably operate the oscillator circuit. When the output of the A.C. generator is to be used as an input for the constant voltage power circuit, a rectifier is included in the constant voltage power circuit which acts to rectify the output of the generator.

The oscillator circuit merely serves to generate a synchronizing signal necessary to operate the inverter circuit and may be selectively used depending upon the construction of an inverter circuit to be used.

As the inverter circuit, a circuit may be used which is adapted to merely allow the frequency to be determined depending upon the oscillating frequency of the oscillator circuit. For example, a circuit in which a thyristor or a power transistor is used as a commutation switch may be used as the inverter circuit. The output of the inverter circuit is supplied to the load through directly or through a filter circuit or the like as desired.

It will thus be seen that the objects set forth above, among those made apparent from the preceding description, are efficiently attained and, since certain changes may be made in the above construction without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An internal combustion engine electrical system comprising:
   an A.C. generator driven by an internal combustion engine;
   a rectifier circuit for rectifying A.C. output generated by said A.C. generator;
   a constant voltage power circuit which outputs a substantially constant D.C. voltage;
   an oscillator circuit driven by means of the output voltage of said constant voltage power circiut;
   an inverter circuit adapted to invert the D.C. output of said rectifier circuit into an A.C. output of a predetermined frequency using the output signal of said oscillator circuit as a commutation command signal;
   a contactless ignition system for controlling the ignition operation of said internal combustion engine;
   an output voltage detecting circuit connected to be responsive to the output of said A.C. generator to generate a detecting signal corresponding to the output voltage of said A.C. generator; and
   an ignition control circuit which is adapted to control said contactless ignition system so as to decrease the rotational speed of said internal combustion engine when said detecting signal of said output voltage detecting circuit reaches a predetermined level.

2. An internal combustion engine electrical system as claimed in claim 1, wherein said A.C. generator comprises a multi-phase generator having multi-phase armature windings connected together a star connection;
   said rectifier circuit includes a full wave rectifier;
   said constant voltage power circuit comprises a Zener diode connected in parallel through a resistor between the neutral point of said multi-phase armature windings and the negative D.C. output terminal of said full wave rectifier, and a capacitor connected in parallel to said Zener diode.

3. An internal combustion engine electrical system as claimed in claim 1, wherein said ignition control circuit is adapted to delay the ignition position of said internal combustion engine in order to decrease the rotational speed of said engine.

4. An internal combustion engine electrical system as claimed in claim 1, wherein said ignition control circuit is adapted to stop the ignition operation of said contactless ignition system in order to decrease the rotational speed of said internal combustion engine.

5. An internal combustion engine electrical system as claimed in claim 1, wherein said A.C. generator is a permanent magnet A.C. generator.

* * * * *